United States Patent
Moesle et al.

(10) Patent No.: US 8,166,274 B2
(45) Date of Patent: Apr. 24, 2012

(54) DATA WRITING IN SYSTEM WITH ALIGNMENT RESTRICTION OR VECTOR-BASED SYSTEMS

(75) Inventors: Frank Moesle, Stuttgart (DE); Piergiorgio Sartor, Fellbach (DE)

(73) Assignee: Sony Deutschland GmbH, Berlin (DE)

( * ) Notice: Subject to any disclaimer, the term of this patent is extended or adjusted under 35 U.S.C. 154(b) by 779 days.

(21) Appl. No.: 11/623,466

(22) Filed: Jan. 16, 2007

(65) Prior Publication Data

US 2007/0234001 A1    Oct. 4, 2007

(30) Foreign Application Priority Data

Mar. 29, 2006   (EP) .................................... 06006570

(51) Int. Cl.
*G06F 12/02* (2006.01)
(52) U.S. Cl. ................. 711/201; 711/E12.005
(58) Field of Classification Search .......................... None
See application file for complete search history.

(56) References Cited

U.S. PATENT DOCUMENTS

| | | | |
|---|---|---|---|
| 5,717,845 A | 2/1998 | Patrick et al. | |
| 5,736,988 A | 4/1998 | Shaw et al. | |
| 6,801,209 B1 | 10/2004 | Chen et al. | |
| 7,346,079 B1 * | 3/2008 | Meyer | 370/476 |
| 2002/0083266 A1 | 6/2002 | Reuter | |
| 2007/0143567 A1 * | 6/2007 | Gorobets | 711/202 |

FOREIGN PATENT DOCUMENTS

JP    2004-343785    12/2004

OTHER PUBLICATIONS

Japanese Office Action issued Dec. 27, 2011 (with Partial English Translation).

* cited by examiner

*Primary Examiner* — Edward Dudek, Jr.
*Assistant Examiner* — Ryan Dare
(74) *Attorney, Agent, or Firm* — Oblon, Spivak, McClelland, Maier & Neustadt, L.L.P.

(57) ABSTRACT

A method for writing data in a system with alignment restriction, where first destination data generated from first source data located in a storage range starting at a first source position is written in a storage range starting at a non-aligned position. The method includes the steps of extracting second source data from a storage range starting at a second source position preceding the first source position, the second source data including the first source data, generating second destination data from the second source data, the second destination data including the first destination data, writing the second destination data in a storage range starting at an aligned position, where the second source position is set such that the first destination data is written in a storage range starting at the non-aligned position.

32 Claims, 3 Drawing Sheets

DATA WRITING IN SYSTEM WITH ALIGNMENT RESTRICTION OR VECTOR-BASED SYSTEMS

The present invention generally relates to the writing of data in vector-based systems, and particularly to the writing of such data at a non-aligned position of a vector-based writing system.

In a system like a memory supporting a vector-based writing or storage, it is not possible to write data at any storage range of the memory. Instead, such a system is segmented into a sequence of adjacent storage ranges or vectors, the system allowing the writing of data only in one or several complete vectors. In other words data may only be written at storage ranges that start at so-called aligned positions or addresses of the memory. Those aligned positions are predefined positions of the memory at which a process may start writing data. The memory positions between said aligned positions are referred to as non-aligned positions. Data cannot be written on such a memory starting from a non-aligned position.

However even when using a vector-based memory, it should be possible to store a given set of data between a starting and an ending position, wherein the starting position is a non-aligned position.

A known technique for achieving this, i.e. for storing data between a starting non-aligned position and an ending position, requires performing a read-modify-write operation. FIG. 1 shows a system comprising a first memory 1 with source data 4 located between two positions 2, 3. The source data 4 is to be stored in a vector-based second memory 5, and more precisely in a destination storage range 9 starting at a non-aligned position 8 of said second memory 5. The destination storage range 9 is part of a vector 15, which is the basis unit for writing data in the second memory 5. The vector 15 starts at an aligned position 6 and comprises a first range 7 located before said destination storage range 9 and a second range 10 after said destination storage range 9.

According to the state of the art method for writing the source data 4 in the destination storage range 9, a read operation is performed at first. This read operation, referred to by arrow 12, consists in reading the content of the vector 15. The data of the vector 15 are read using the alignment of said second memory 5, and copied into a temporary storage range 17 of a third memory 11 without alignment restriction. Then, the source data 4 are extracted from said first memory 1, see arrow 13, so as to modify a storage range 16 of the third memory 11 corresponding to the destination storage range 9 of the second memory 5. Once the source data 4 are copied in the temporary storage range 17, said temporary storage range 17 is written in the vector 15 using the alignment of said second memory 5. It is thus ensured that the source data 4 starts at the non-aligned position 8 of said second memory 5.

A disadvantage of this prior art method is that it requires reading and modifying the content of the second memory 5 prior to writing data on said second memory 5. Further, the third local memory 11 is needed in addition to the first and second memories for modifying the data read from the second memory 5.

In view of the above, it is the object of the invention to provide a simplified method and system for writing data in a system with alignment restriction, said data to be written being generated from source data.

The solution of the present invention consists in generating extended destination data to be written from an aligned position, such that destination data comprised in said extended destination data are located in a storage range starting at a desired non-aligned position. This solution can be used in systems with alignment restriction, i.e. systems that allow writing data only from an aligned position, or even in vector-based systems, i.e. systems that allow writing data only between two aligned positions.

Thus, instead of generating destination data on the basis of source data and writing said destination data from a desired non-aligned position via a read-modify-write operation, extended source data are selected and extracted and extended destination data are directly generated therefrom. The extended source data comprise said source data as well as adjacent additional data. The amount of said adjacent additional data is set such that, upon writing the extended destination data from an aligned position, the destination data comprised in the extended destination data can be written from said desired non-aligned position.

Therefore data are written from a vector-length aligned output position immediately after the generation or processing step. It is however guaranteed that the appropriate data, i.e. the destination data, are written from the desired non-aligned output position.

The solution proposed by the invention has therefore following advantages:
- The read-modify-write operation is not needed anymore as the extended destination data can be written from an aligned position of the system.
- As no read-modify-write operation is required, the additional local memory used during said read-modify-write operation is superfluous.
- The writing processing time can be speeded up because the destination data are written immediately after having been generated.

According to a first aspect of the present invention, it is proposed a method for writing data in a system with alignment restriction, wherein first destination data generated from first source data located in a storage range starting at a first source position are written in a storage range starting at a non-aligned position of a vector-based system. The method comprises a step of extracting second source data from a storage range starting at a second source position preceding the first source position, said second source data comprising said first source data. In a next step, the method generates second destination data from said second source data, said second destination data comprising said first destination data. Then said second destination data are written in a storage range starting at an aligned position. The second source position is set such that said first destination data are written in a storage range starting at said non-aligned position.

Particularly, said first destination data can be generated by a process that generates output data from input data, and the method can comprises determining said second source position on the basis of a ratio reflecting the relationship between the size of said output data and the size of said input data.

Said second source position can be determined on the basis of the distance between said non-aligned position and said aligned position.

Said second source position can be determined according to following equation:

$$SP2 = SP1 - d/r$$

wherein
SP1 is the value of the first source position,
SP2 is the value of the second source position,
r is the ratio of the size of said output data to the size of said input data
d is the distance between the non-aligned position and the aligned position.

It should be noted that for a given generation process the ratio r and the distance d may be constant values or may depend on further parameters. The values r and d can e.g. be dependent on the value SP1 of the first source position such that r=r(SP1) and d=d(SP1).

In the specific case of video processing, r and d can be functions of the horizontal and vertical position in the image, i.e. in the first source data. The dependency of the horizontal position is particularly proposed by the invention in case of non-linear scaling, like e.g. in panorama algorithms for widescreen televisions. The dependency of the vertical position is important in case of barrel correction or pin cushion algorithms, for example for image data from digital cameras.

The method can further comprise the step of determining said second source position on the basis of the size of said first source data and said first destination data and on the basis of the distance between the non-aligned position and the aligned position.

The aligned position can be the first aligned position preceding said non-aligned position.

The size of said second source data can be chosen such that said second destination data fit between said aligned position and a further aligned position.

Said first destination data can be generated by a process that generates output data from input data. The storage range of said second source data can stop at a third source position that is computed on the basis of a ratio reflecting the relationship between the size of said output data and the size of said input data.

Particularly, said third source position can be determined on the basis of the distance between said aligned position and said further aligned position.

Said third source position can be computed as follows:

$$SP3=SP2+dZ/r$$

wherein

SP3 is the value of the third source position,
SP2 is the value of the second source position,
r is the ratio of the size of said output data to the size of said input data,
dZ is the distance between the aligned position and the further aligned position.

Similarly to the generation of the second source position SP2, the ratio r and the distance dZ can be here constant values or can depend on further parameters.

A third source position, which is defined as being the stop position of the storage range of said second source data, can be computed on the basis of the size of said first source data and said first destination data and on the basis of the distance between the aligned position and the further aligned position.

The further aligned position can be the first aligned position following the storage range of said first destination data.

Said first source data and said first destination data can be video data.

Alternatively, said first source data and said first destination data can be audio data.

Said second destination data can be generated by a filter or a one-dimensional filter.

Said second destination data can be generated by a linear filter, a non-linear filter, a data rate change filter, or a data delay filter.

According to a further aspect of the invention, it is proposed a method for writing destination data in a storage range of a vector-based system starting at a non-aligned position, said destination data being generated from data contained in a source storage range. The method comprises extending said source storage range, generating temporary data from the data in the extended source storage range, said temporary data comprising said destination data, and writing said temporary data in a storage range of said vector-based system starting at an aligned position. Said source storage is extended such that said destination data are written at a storage range starting at said non-aligned position.

According to a further aspect of the invention, a computer program product is proposed, said computer program product being adapted to implement a method according to the above when run in a computing system.

According to a still further aspect of the invention, it is proposed a system for writing data comprising a first memory comprising first source data located in a storage range starting at a first source position, a processing unit for generating first destination data from said first source data, a second memory with alignment restriction for receiving first destination data in a storage range starting at a non-aligned position. Extracting means is adapted to extract second source data from a storage range starting at a second source position of the first memory, said second source position preceding the first source position and said second source data comprising said first source data. Said processing unit is adapted to generate a second destination data from said second source data, said second destination data comprising said first destination data. Writing means is adapted to write said second destination data in a storage range starting at an aligned position of the second memory. The second source position used by said extracting means is such that said first destination data are stored in a storage range of the second memory starting at said non-aligned position.

It has to be noted that the various elements of the invention which are referred to as means and the corresponding functionality can be implemented with any kind of respective device, unit, software of hardware elements and parts thereof as well as any other suitable implementation not explicitly mentioned here.

Further, the various parameters that are determined according to the invention—like the second source position, the size of the second source data, or the third source position—can be computed by computing means especially adapted thereto and/or by other hardcoded means. Such hardcoded means may comprise means for storing pre-calculated values into a memory and means for retrieving said pre-calculated values. Particular embodiments may comprise one or a plurality of look-up tables containing pre-calculated position or size values.

The features, objects, and advantages of the present invention will become more apparent from the detailed description set forth below when taken in conjunction with the drawings, wherein.

The method of writing data according to the present invention will be at first described with reference to FIG. 2.

Figure 1:
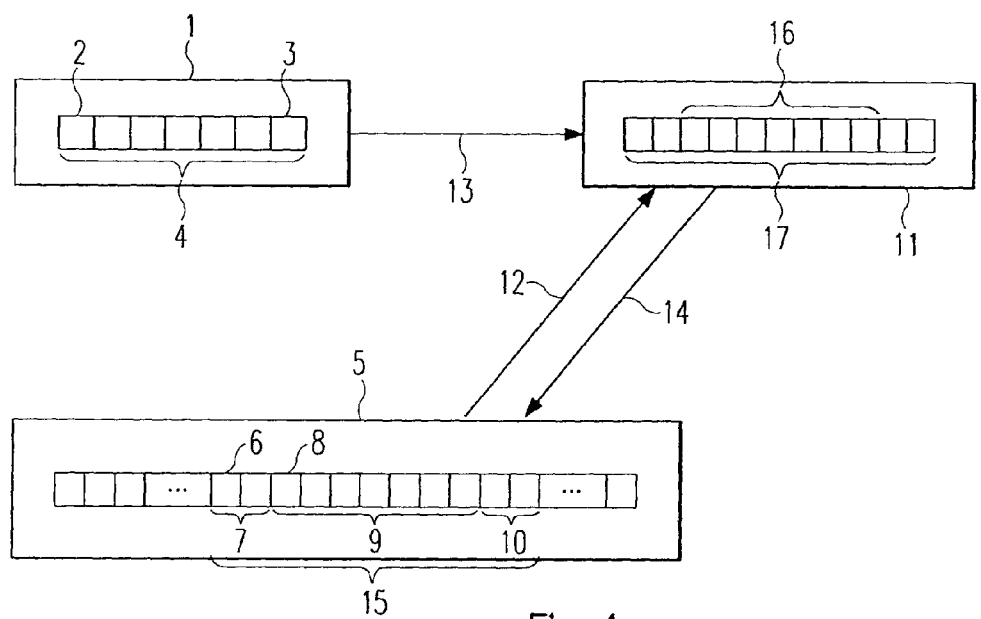
FIG. 1 shows a known technique of writing data according to the prior art.
Figure 2:
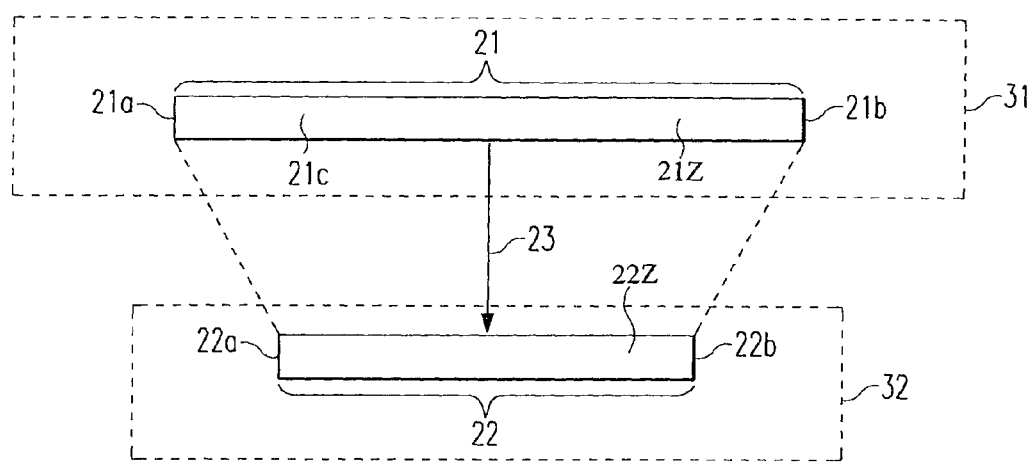
FIG. 2 shows an embodiment for writing data in a vector-based system according to the invention.

FIG. 2 shows a first or source storage range 21 containing source data 21Z. The source storage range 21 is limited by a first or starting position 21a and by a second or ending position 21b, and may contain zero, one, or a plurality of intermediate positions 21c in between. Each of the starting position 21a, the ending position 21b and the intermediate positions 21c is an addressable position within a first or source addressable storage means 31.

The storage means 31 is a container that is able to hold data in machine-readable format. Said storage means 31 may comprise one or a plurality of data storage device among e.g. random-access memory (RAM), read-only memory (ROM), magnetic tapes, disks, or drums. Being volatile or non-volatile, the storage means 31 can be a primary storage device, i.e. a computer memory directly accessible to the central unit of a computer for fast data storage or data access like RAM or ROM, or a secondary storage device, i.e. a memory device not directly accessible to the central unit of a computer but having in general higher storage capacity like hard disk, magnetic tape, or disk.

Said starting position 21a, ending position 21b and intermediate positions 21c are memory positions or addresses representing a unique identifier for a memory location at which a computer or other device can store a piece of data. Particularly, if said storage means 31 is a byte-addressable memory, each position identifies a single byte of storage. In a word-addressable or vector-addressable memory, the typical storage unit for a position may be larger than a byte and use e.g. 16 bit words or vectors. This storage unit size may be referred to as the vector length.

A second or destination storage range 22 for receiving destination data 22Z is comprised in a second or destination storage means 32. Said storage means 32 may be any addressable data storage device that operates in a vector-based manner or in a vector-based system. In other words, it is not possible to write data at an arbitrary position. Rather data may be written only on vectors of said destination storage means 32, i.e. between two so-called aligned positions of the destination storage means 32.

The destination storage range 22 starts at a first or starting position 22a and ends at a second or ending position 22b, each of said starting position 22a and ending position 22b being either an aligned or a non-aligned position of the destination storage means 32.

According to the invention, the destination data 22Z that is to be written in the destination storage range 22 is generated using said source data 21Z of the source storage range 21. This generation step, referred to by arrow 23 in FIG. 2, may be limited to a simple copy operation, or may be a more complex processing operation like filtering. Such a filter can comprise a one-dimensional filter like linear filtering, non-linear filtering, data rate change, or data delay.

Said source data 21Z and said destination data 22Z may be e.g. audio and/or video data. Video data may comprise a single fixed image or a sequence of successive images. In the case of audio data, an example of generation of destination data 22Z includes changing the sampling rate of an audio stream. In the case of video data, the generation of destination data 22Z from source data 21Z may include scaling a video image.

The writing method of the present invention will now be described with reference to FIGS. 3 to 5.

Figure 3:
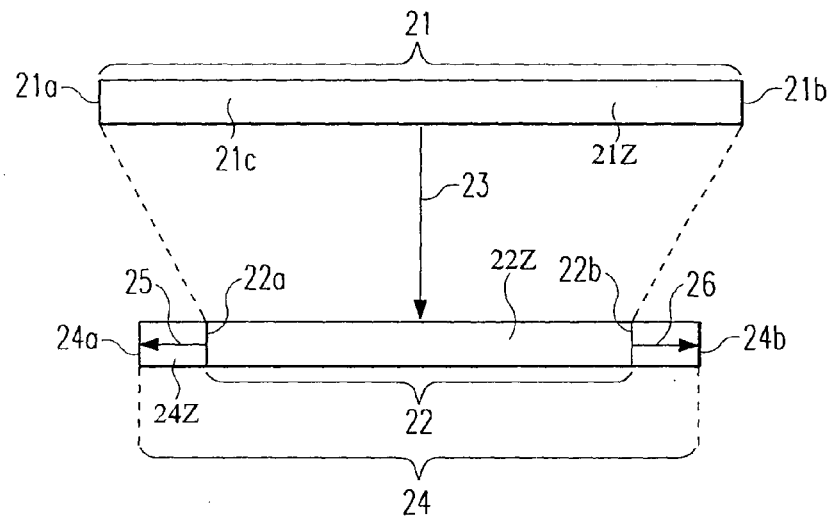
FIGS. 3 to 5 show a method for writing data in a vector-based system according to the invention.
Figure 4:
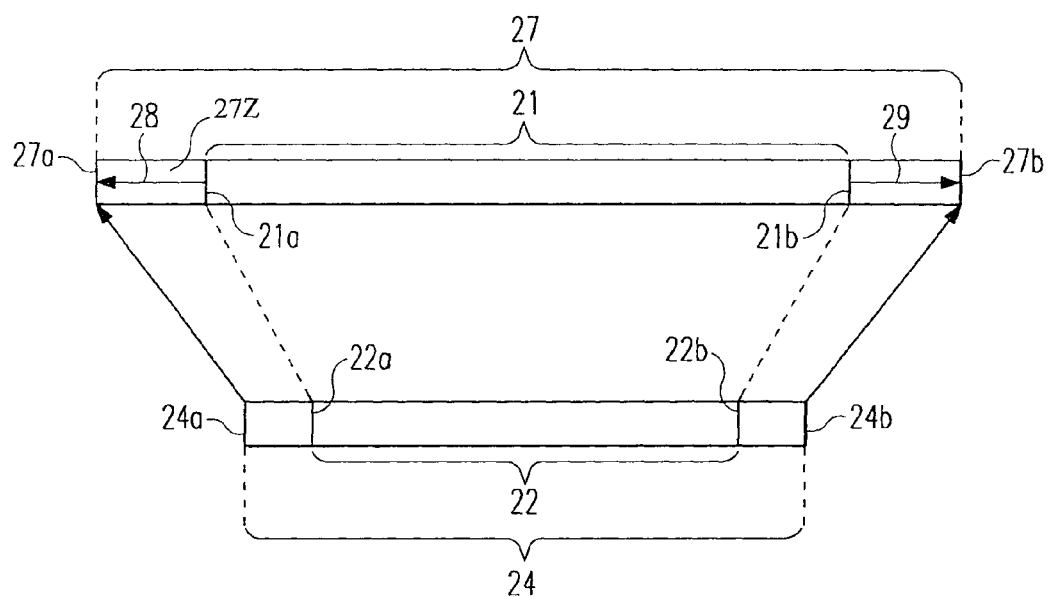
Figure 5:
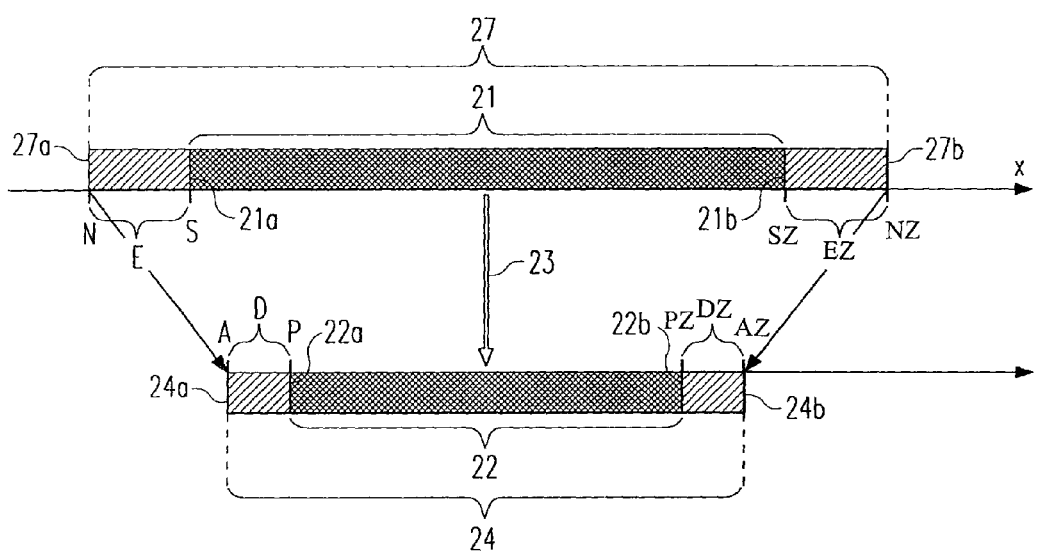

The embodiment shown in FIGS. 3 to 4 is directed to the writing or storing of destination data 22Z in a destination storage range 22 starting at a starting position 22a that is a non-aligned position of the destination storage means 32. Assuming said destination storage means 32 is a vector-based system having a vector length V, the starting position 22a of value P is thus not a multiple of V.

According to the invention, data are not written in said destination storage range 22 starting at a desired non-aligned position but are written in an extended destination storage range 24 comprising said destination storage range 22. It is assumed that writing outside of said destination storage range 22 is allowed. Preferably the extended destination storage range 24 is chosen 25, 26 such that it is composed or made up of one or a plurality of vectors of the destination storage means 32. The boundaries i.e. the starting and ending positions 24a, 24b of said extended destination storage range 24 coincide with aligned positions.

In the present embodiment, data can be stored in the destination storage means 32 only between two aligned positions of a set of predefined aligned positions. According to alternative embodiments, data may be stored in a destination storage range 22 starting at an aligned position and ending at either an aligned or a non-aligned position. In this case the ending position 24b of the extended destination storage range does not need to coincide with an aligned position, and may preferably correspond to the ending position 22b of the destination storage range 22.

Preferably the starting position 24a, respectively the ending position 24b, of the extended destination storage range 24 is the first aligned position preceding, respectively following, the destination storage range 22.

The value P of the desired starting position 22a for the destination data 22Z can thus be decomposed into:

$$P = A + D$$

wherein A is the value of the starting position 24a of the extended destination storage range 24, and D is the difference between the value P of non-aligned position 22a and the value A of aligned position 24a. The value A refers to an aligned position and is thus a multiple of V, V being the vector length of the system.

FIG. 4 shows that instead of generating destination data 22Z to be written from the desired non-aligned position 22a as known from the prior art, the invention proposes to extend 28, 29 the source data range 21 to an extended source storage range 27. The extended destination data 24Z can thereafter be generated using said extended source storage range 27, and can be written directly from an aligned position 24a.

Therefore the starting position 27a and ending position 27b of the extended source storage range 27 has to be determined. This can be achieved by taking into account the characteristics of the generation step 23, and particularly the relationship between the size of data before and after said generation step 23, which is referred to hereinafter as size ratio.

For example, if the generation step 23 consists in downscaling image data or reducing the sampling rate of audio data by a factor of 2, the size of the generated data is half the size of the original image data. In this case the size ratio would be equal to ½. For simple filtering like delay, the size ratio might be equal to 1, and for data rate changing filters, it might be different to 1.

The size ratio of the generation process 23 can be determined in several ways. The size ratio may be stored in the processing unit generating the destination data or elsewhere, so that a computing means can read it and determine the starting position 27a. Alternatively, it might be necessary to sent test data to the generation process 23, and to compare the size of said test data before and after the generation process 23 to determine the size ratio.

Knowing the size ratio, a computing means or an adapted printed circuit is then able to determine the starting position 27a of the extended source storage range 27 by applying following equation:

$$N = S - E$$

wherein N is the value of the starting position 27a of the extended source storage range 27,
S is the value of the starting position 21a of the source storage range 21, E is the distance between the beginning of the extended source storage range 27 and the source storage range 21.

The distance E is determined by following equation:

$$E = D/r$$

wherein D is the difference between the value P of the non-aligned position 22a and the value A of the aligned position 24a, and
r is the size ratio of the generation process 23.

The parameters D and r may be constant values along the source storage range 21 and the extended source storage range 27. Alternatively, D and r can depend on further parameters. Particularly, D and r can be dependent on the abscissa or position x within the source storage range 21 and/or within the extended source storage range 27.

If the source data 21Z is an image or a video data, the parameters D and r can be functions of the horizontal and vertical position in the image, which means that said parameters are functions of the abscissa x in the source storage range 21. The values D(x) and r(x), which are well defined within said source storage range 21, may then be extended to the whole extended source storage range 27 such that the value N can be computed.

The dependency of the horizontal position may be used in case of non-linear scaling, like e.g. in panorama algorithms for widescreen televisions.

The dependency of the vertical position is important in case of barrel correction or pin cushion algorithms, for example for image data from digital cameras. Barrel correction is carried out in case of barrel distortion, which is a divergence from the rectilinear projection in geometric optics where image magnification decreases with increasing distance from the optical axis. The visible effect of barrel distortion is that lines that do not go through the centre of the image are bowed outwards, towards the edge of the image. Pin cushion algorithms may be employed for reducing pin cushion distortion, which is a divergence from the rectilinear projection in geometric optics where image magnification increases with increasing distance from the optical axis, and which visible effect is that lines that do not go through the centre of the image are bowed inwards towards the centre of the image.

As already mentioned above, some writing systems may require only the starting position 27a of the extended source storage range 27 to be an aligned position, such that the ending position 27b thereof can be chosen to correspond to the ending position 21b of the source storage range 21.

On the other hand other writing systems may require both the starting 27a and the ending 27b positions of the extended source storage range 27 to be aligned positions. The ending position 27b can be determined using the size ration in a similar way:

$$NZ = SZ + EZ = SZ + DZ/r$$

wherein NZ is the value of the ending position 27b of the extended source storage range 27,
SZ is the value of the ending position 21b of the source storage range 21,
EZ is the distance between the ending of the extended source storage range 27 and the source storage range 21, and
DZ is the distance between the ending of the extended destination storage range 24 and the destination storage range 22.

Alternatively, the value NZ of the ending position 27b can be determined via the following equation:

$$NZ = N + (AZ - A)/r$$

wherein AZ is the value of the ending position 24b of the extended destination storage range 24.

The invention claimed is:

1. A method for writing data in a storage range of a vector-based system with alignment restriction, the method comprising:
   generating first destination data generated from first source data located in a storage range starting at a first source position;
   extracting second source data from a storage range starting at a second source position preceding the first source position, said second source data comprising said first source data;
   generating second destination data from said second source data, said second destination data comprising said first destination data; and
   writing said second destination data in a storage range starting at an aligned position,
   wherein the second source position is set such that said first destination data are written by way of the writing of said second destination data in a storage range starting at a non-aligned position,
   wherein said first destination data are written by way of the writing of said second destination data in a storage range starting at said non-aligned position,
   wherein the system allows writing data only for aligned positions and requires any writing to begin at an aligned position and to end at a further aligned position, and
   wherein generating of said second destination data includes changing a sampling rate of an audio stream, scaling of a video image, linear filtering, non-linear filtering, data rate change, or data delay.

2. The method according to claim 1,
   wherein said first destination data are generated by a process that generates output data from input data, and
   the method comprises
   determining said second source position on the basis of a ratio reflecting the relationship between the size of said output data and the size of said input data.

3. The method according to claim 2,
   wherein said second source position is determined on the basis of the distance between said non-aligned position and said aligned position.

4. The method according to anyone of the claims 2 to 3,
   wherein said second source position is determined according to following equation:

$$SP2 = SP1 - d/r$$

wherein
   SP1 is the value of the first source position,
   SP2 is the value of the second source position,
   r is the ratio of the size of said output data to the size of said input data
   d is the distance between the non-aligned position and the aligned position.

5. The method according to claim 1, further comprising the step of determining said second source position on the basis of the size of said first source data and said first destination data and on the basis of the distance between the non-aligned position and the aligned position.

6. The method according to claim 5,
   wherein the aligned position is the first aligned position preceding said non-aligned position.

7. The method according to claim 5,
   wherein the size of said second source data is chosen such that said second destination data fit between said aligned position and a further aligned position (24b).

8. The method according to claim 7,
wherein
said first destination data are generated by a process that generates output data from input data, and
the storage range of said second source data stops at a third source position that is determined on the basis of a ratio reflecting the relationship between the size of said output data and the size of said input data.

9. The method according to claim 8,
wherein said third source position is determined on the basis of the distance between said aligned position and said further aligned position.

10. The method according to claim 8 or 9,
wherein said third source position is computed as follows:

$$SP3=SP2+d'/r$$

wherein
SP3 is the value of the third source position,
SP2 is the value of the second source position,
r is the ratio of the size of said output data to the size of said input data,
d' is the distance between the aligned position and the further aligned position.

11. The method according to claim 10,
wherein
a third source position, which is defined as being the stop position of the storage range of said second source data, is determined on the basis of the size of said first source data and said first destination data and on the basis of the distance between the aligned position and the further aligned position.

12. The method according to claim 7,
wherein the further aligned position is the first aligned position following the storage range of said first destination data.

13. The method according to claim 12,
wherein said first source data and said first destination data are video data.

14. The method according to claim 12,
wherein said first source data and said first destination data are audio data.

15. A method for effectively writing destination data in a storage range of a vector-based system with alignment restriction, wherein the system allows writing data only for aligned positions and requires any writing to begin at an aligned position and to end at a further aligned position, the method comprising:
extending said source storage range;
generating temporary data from the data contained in the extended source storage range including changing a sampling rate of an audio stream, scaling of a video image, linear filtering, non-linear filtering, data rate change, or data delay, said temporary data comprising said destination data; and
writing said temporary data in a storage range of said vector-based system starting at an aligned position, said source storage range being extended such that said destination data are effectively written at a storage range starting at said non-aligned position,
wherein the system allows writing data only for aligned positions and requires any writing to begin at an aligned position and to end at a further aligned position.

16. A non-transitory computer readable medium having stored thereon a program that when executed by a computer causes the computer to execute a method for writing data in a storage range of a vector-based system with alignment restriction, comprising:
generating first destination data from first source data located in a storage range starting at a first source position;
extracting second source data from a storage range starting at a second source position preceding the first source position, said second source data comprising said first source data;
generating second destination data from said second source data, said second destination data comprising said first destination data; and
writing said second destination data in a storage range starting at an aligned position,
wherein the second source position is set such that said first destination data are written by way of the writing of said second destination data in a storage range starting at a non-aligned position,
wherein said first destination data are written by way of the writing of said second destination data in a storage range starting at said non-aligned position,
wherein the system allows writing data only for aligned positions and requires any writing to begin at an aligned position and to end at a further aligned position, and
wherein generating of said second destination data includes changing a sampling rate of an audio stream, scaling of a video image, linear filtering, non-linear filtering, data rate change, or data delay.

17. A system for writing data comprising:
a first memory comprising first source data located in a storage range starting at a first source position;
a processing unit for generating first destination data from said first source data; and
a second memory with alignment restriction for receiving first destination data in a storage range starting at a non-aligned position,
wherein an extracting unit is configured to extract second source data from a storage range starting at a second source position of the first memory, said second source position preceding the first source position and said second source data comprising said first source data,
wherein said processing unit is configured to generate a second destination data from said second source data, said second destination data comprising said first destination data, and
wherein a writing unit is configured to write said second destination data in a storage range starting at an aligned position of the second memory,
wherein the second source position used by said extracting means is such that said first destination data are stored in a storage range of the second memory starting at said non-aligned position,
wherein the system allows writing data only for aligned positions and requires any writing to begin at an aligned position and to end at an aligned position, and
wherein said processing unit is further configured to generate said second destination data by changing a sampling rate of an audio stream, scaling of a video image, linear filtering, non-linear filtering, data rate change, or data delay.

18. The system according to claim 17,
wherein a determining unit is configured to determine said second source position on the basis of a ratio reflecting the relationship between the size of output data of said processing unit and the size of input data of said processing unit.

19. The system according to claim 18,
wherein the determining unit is configured to determine said second source position on the basis of the distance between said non-aligned position and said aligned position.

20. The system according to claim 18,
wherein the determining unit is configured to determine said second source position according to following equation:

$$SP2 = SP1 - d/r$$

wherein
SP1 is the value of the first source position,
SP2 is the value of the second source position,
r is the ratio of the size of said output data to the size of said input data
d is the distance between the non-aligned position and the aligned position.

21. The system according to claim 18, wherein the determining unit is a computing device or one or a plurality of look-up tables.

22. The system according to claim 17,
wherein a determining unit is configured to determine said second source position on the basis of the size of said first source data and said first destination data and on the basis of the distance between the non-aligned position and the aligned position.

23. The system according to claim 17,
wherein the aligned position is the first aligned position preceding said non-aligned position.

24. The system according to claim 17,
wherein a determining unit is configured to determine the size of said second source data such that said second destination data fit between said aligned position and a further aligned position.

25. The system according to claim 24,
wherein the determining unit is configured to determine a third source position on the basis of a ratio reflecting the relationship between the size of output data of said processing unit and the size of input data of said processing unit, said third source position being the position where the storage range of said second source data stops.

26. The system according to claim 25,
wherein the determining unit is configured to determine said third source position on the basis of the distance between said aligned position and said further aligned position.

27. The system according to claim 26,
wherein said third source position is computed as follows:

$$SP3 = SP2 + d'/r$$

wherein
SP3 is the value of the third source position,
SP2 is the value of the second source position,
r is the ratio of the size of said output data to the size of said input data,
d' is the distance between the aligned position and the further aligned position.

28. The system according to claim 24,
wherein the determining unit is configured to determine a third source position, which is defined as being the stop position of the storage range of said second source data, on the basis of the size of said first source data and said first destination data and on the basis of the distance between the aligned position and the further aligned position.

29. The system according to claim 24,
wherein the further aligned position is the first aligned position following the storage range of said first destination data.

30. The system according to claim 17,
wherein said first source data and said first destination data are video data.

31. The system according to claim 17,
wherein said first source data and said first destination data are audio data.

32. The system according to claim 17,
wherein first memory and second memory are parts of a common memory.

* * * * *